No. 710,199. Patented Sept. 30, 1902.
W. KLOCKE.
CLUTCH FOR POWER PRESSES.
(Application filed Mar. 12, 1902.)

(No Model.) 3 Sheets—Sheet 1.

WITNESSES:
René Bruine
Fred White

INVENTOR:
William Klocke,
By Attorneys,

THE NORRIS PETERS CO., PHOTO-LITHO., WASHINGTON, D. C.

No. 710,199. Patented Sept. 30, 1902.
W. KLOCKE.
CLUTCH FOR POWER PRESSES.
(Application filed Mar. 12, 1902.)
(No Model.) 3 Sheets—Sheet 2.

WITNESSES:
Rene Bruine
Fred White

INVENTOR:
William Klocke,
By Attorneys,

No. 710,199. Patented Sept. 30, 1902.
W. KLOCKE.
CLUTCH FOR POWER PRESSES.
(Application filed Mar. 12, 1902.)
(No Model.) 3 Sheets—Sheet 3.
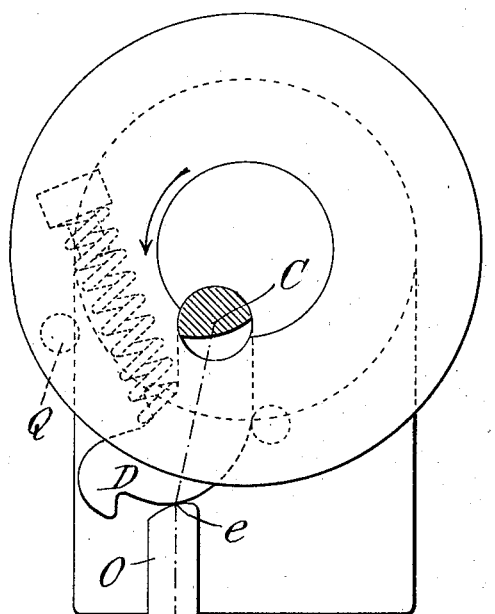
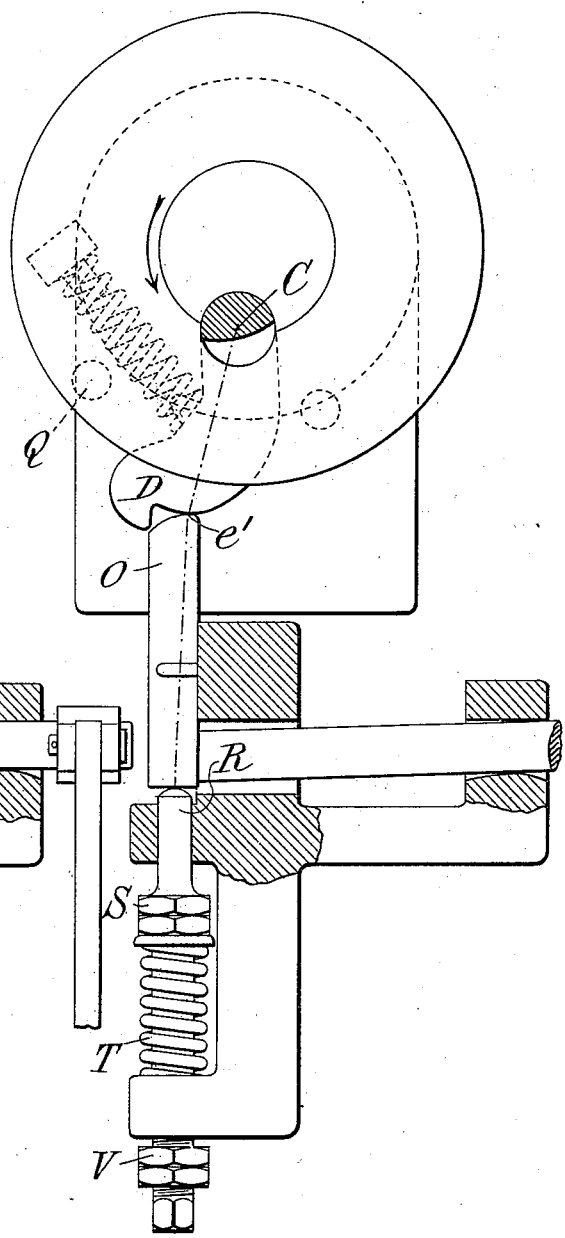
WITNESSES:
René Bruine
Fred White
INVENTOR:
William Klocke,
By Attorneys,

UNITED STATES PATENT OFFICE.

WILLIAM KLOCKE, OF BROOKLYN, NEW YORK, ASSIGNOR TO E. W. BLISS COMPANY, OF NEW YORK, N. Y., A CORPORATION OF WEST VIRGINIA.

CLUTCH FOR POWER-PRESSES.

SPECIFICATION forming part of Letters Patent No. 710,199, dated September 30, 1902.

Application filed March 12, 1902. Serial No. 97,916. (No model.)

*To all whom it may concern:*

Be it known that I, WILLIAM KLOCKE, a citizen of the United States, residing in the borough of Brooklyn, county of Kings, city and State of New York, have invented certain new and useful Improvements in Clutches for Power-Presses, of which the following is a specification.

In power-presses—such, for example, as those used in stamping sheet metal—it is common to connect the main shaft of the press to a driving-pulley, the hub of which surrounds such shaft, by means of an oscillating clutch-key seated in one of said parts and adapted to be oscillated into engagement with a recess in the other of said parts.

My invention aims to provide certain improvements in clutches of this general type whereby the shocks usually occurring in the operation of the press are largely eliminated, whereby the operation of the clutch is rendered more certain and the durability of the clutch greater, and whereby various other advantages are secured, as hereinafter specified.

The accompanying drawings illustrate a clutch embodying my invention.

Figure 1:
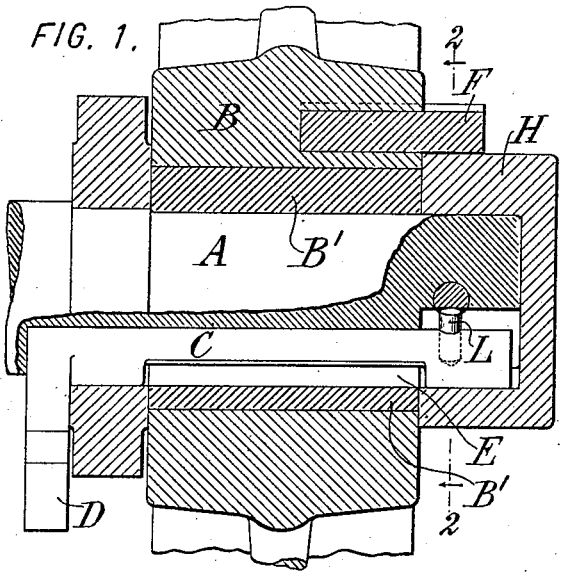
Figure 2:
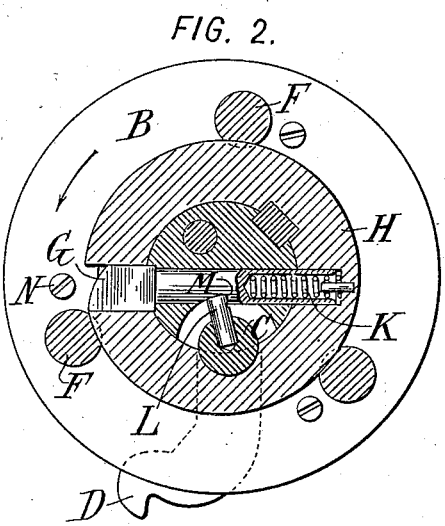
Figure 3:
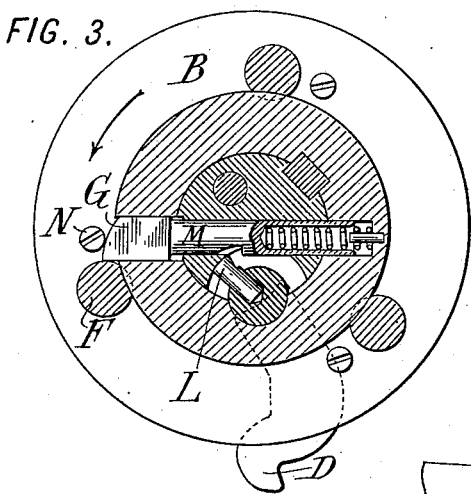
Figure 4:
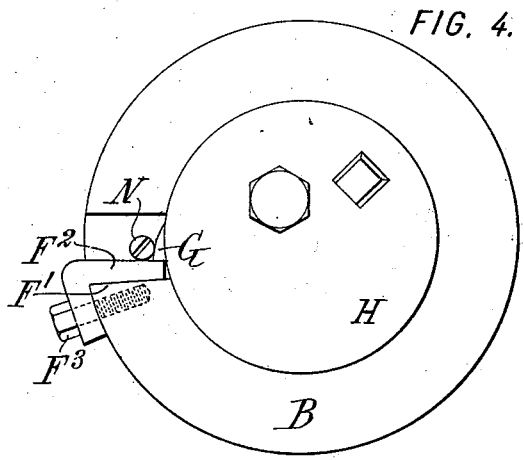
Figure 5:
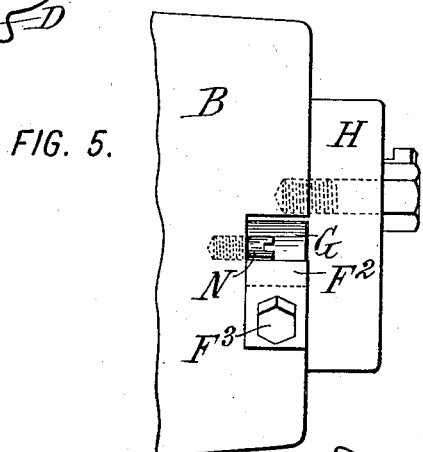
Figure 6:
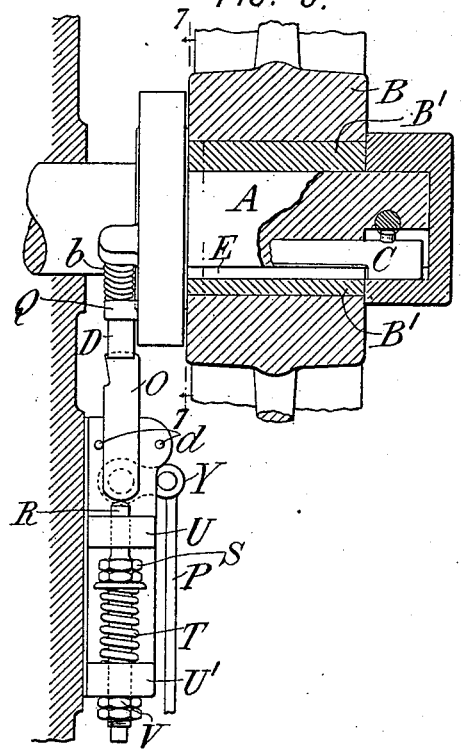
Figure 7:
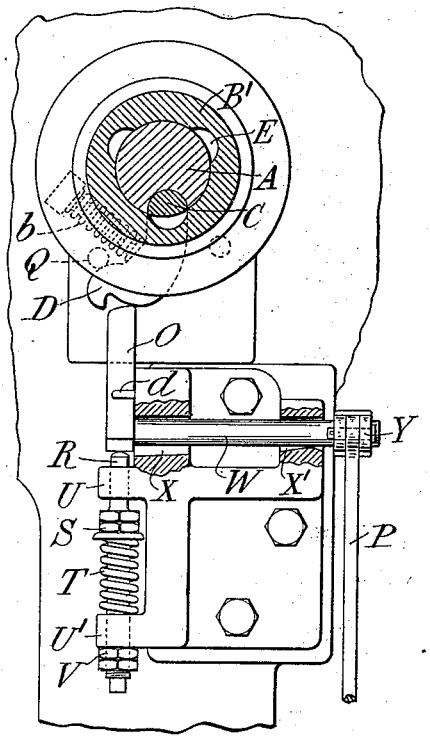
Figure 9:
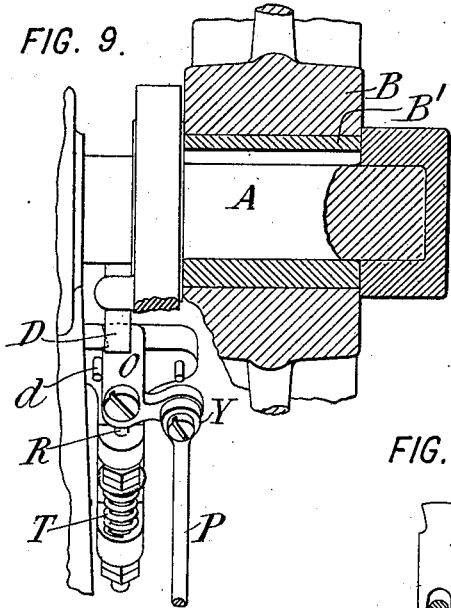
Figure 8:
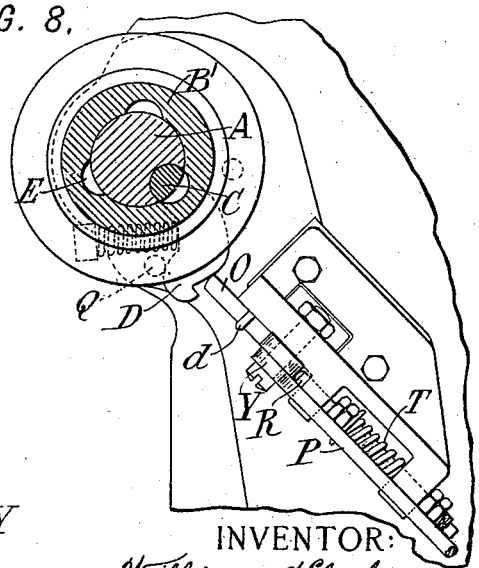
Figure 10:
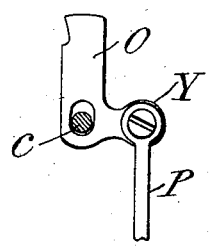

Figure 1 is a view, partly in elevation and partly in section, showing the clutch-key and connected parts and also the hub surrounding the shaft. Fig. 2 is a section on the line 2 2 of Fig. 1, the clutch being in the inoperative position. Fig. 3 is a view of the same parts when the clutch is moved into operative position. Figs. 4 and 5 are, respectively, an end and a side elevation illustrating another embodiment of the invention. Fig. 6 is a view similar to Fig. 1, but showing the clutch-operating mechanism. Fig. 7 is a section on the line 7 7 of Fig. 6. Fig. 8 is a view similar to Fig. 7, showing an embodiment of the invention which I propose to use on presses having an inclined frame. Fig. 9 is a side elevation of Fig. 8 partly in section. Fig. 10 is a detail of the mechanism of Figs. 8 and 9. Figs. 11 and 12 are views illustrating, on a larger scale, successive positions in the operation of the clutch.

It is to be understood that my invention contemplates improvements in a clutch of the general type described and which are useful whether the shaft or the hub be the driving member and whether the clutch-key be seated in the shaft or in the hub. I will explain, first, the usual operation of clutches of this type and will then explain my improvements thereon.

Referring to the accompanying drawings, A indicates a shaft, such as the shaft of a power-press, around which rotates a hub B, preferably journaled directly thereon. A bushing B' forms substantially a part of the hub.

C is a clutch-key seated in the shaft and journaled at its opposite ends in suitable recesses in the shaft and having at its inner end a curved arm D, whereby it may be oscillated. The portion of the clutch-key C which is within the hub B is of the cross-section indicated by dotted lines in Figs. 2 and 3 and by full lines in Figs. 7 and 8, so that ordinarily the hub rotates around the shaft without engagement with the key. The hub, however, is formed with a series of recesses E of any desired number, usually three, which when they register with the recess of the shaft which carries the key form with such recess a complete circle and permit the key to be rotated partially into such recess to the position indicated in dotted lines in Fig. 3. The rear wall of the recess E in the hub B then engages the key and carries the shaft around until the arm D is turned to return the key to the unclutched position. As the hub B rotates with the parts in the position of Fig. 3, the movement of the shaft is steady and without play, the work holding the shaft back, so that the clutch-key bears against the rear face of the recess in the hub, as explained. It is common in power-presses, however, to use a compound die, in the operation of which a heavy spring is brought under compression during the movement of the crank or similar element on the main shaft. In these presses as soon as the crank passes the dead-center the spring, which was under compression, pushes the crank up and the shaft forward with great force, so that there is a tendency on the part of the shaft to move suddenly ahead of the driving-hub, and as there is considerable play between the forward face of the clutch-key and the forward face of the recess in the hub the shaft moves a considerable distance and causes a very severe jarring and wear of the parts. It has been proposed to prevent this relatively forward movement of the shaft by means of a holdback consisting of a sort of pawl-and-ratchet connection between the hub and the shaft, whereby the hub is permitted to move forward relatively to the shaft, but the shaft is held back from moving forward relatively to the hub, this ratchet and pawl clicking into engagement continually during the rotation of the hub whether the hub is to be clutched to the shaft or not. In operation this device produces a disagreeable noise and wears rapidly.

According to one feature of my invention I provide an improved holdback which operates only when it is needed and which secures a close connection without play in either direction between the hub and the shaft when the clutch is in operation. For this purpose I provide that the means for moving the holdback into operation shall be controlled by the movement of the clutch. In order that there may be a slight interval of time between the first movement of the clutch-key and the bringing of the holdback into operation, I preferably provide a spring which tends to move the latter into its operative position and combine therewith means which normally restrain the spring, but which are controlled by the movement of the clutch to release the spring.

Figs. 1 to 5 illustrate the construction and operation of the holdback. According to this embodiment of my invention a fixed stop F, (or several of such stops where the hub is provided with several points at which the clutch may be engaged with it,) which consists, preferably, of a pin projecting from the outer face of the hub, is provided. A movable stop G consists, preferably, of a bolt sliding transversely through the shaft in position to engage the fixed stop F. In the construction shown the bolt G and operating mechanism is partly in the shaft itself and partly in the cap H on the end of the shaft. During the first movement of the clutch-key, from the position of Fig. 2 to that of Fig. 3, the hub B has still a slight forward movement relatively to the shaft, so that a rigid connection between the key and the bolt G would be undesirable, requiring a certain amount of free play between the fixed stop F and the end of the bolt G. I avoid this looseness by providing a spring K, which tends constantly to move the bolt G outward, and by providing a pin L on the key, which in the inoperative position of the key engages a shoulder M on the bolt to restrain the same, but which in the clutching position of the key, Fig. 3, releases the bolt and permits the spring K to press it forward as soon as the rear wall of the recess in the hub has moved up to a close fit against the key and the fixed stop F has moved as far forward as possible relatively to the bolt. I preferably provide adjacent to each of the fixed stops F a similar pin N for limiting the outward movement of the bolt G.

It sometimes happens that the shaft gets stuck and it is desired to start the same by turning the driving-pulley by hand. In this case it is desirable to have some play between the driving-pulley and the shaft, so that the former may be turned backward a little distance and then pulled forward with a jerk to start the shaft. For this purpose I propose to use in place of the fixed stop F a removable stop, Figs. 4 and 5, which may be a pin adapted to be taken out when required, but which is preferably formed as a filling-piece $F^2$, which is detachably connected to the hub, as by means of the bolted connection $F^3$ shown. Upon removing the filling-piece $F^2$ the desired play is afforded between the front face of the bolt and the face of the shoulder F', against which the filling-piece rests.

In Figs. 4 and 5 I have shown the hub provided with a single shoulder; but it will be understood that the shoulders or other fixed stops used correspond in number and position with the number of grooves E in the hub.

I will now describe the mechanism for operating the clutch-key, which is omitted from Figs. 1 to 5 for the sake of clearness, but which is illustrated in detail in the remaining figures.

With the operating mechanism previously in use it occurs sometimes in turning the key to the unclutching position that it is turned too little and an edge is left projecting against the inner bearing-face of the hub, which strikes the edges of the recesses E of the hub, so that such edge wears very rapidly. According to my invention I provide against this contingency by mounting the usual operating member yieldingly and by providing means for adjusting the normal distance of the projection of said member into the path of the arm. Thus regardless of the wear of the parts the operating member may be so adjusted as to move the arm fully back to its proper position. The operating member is preferably supported upon a yielding abutment, and the adjustment referred to is effected by adjusting the position of the abutment toward or away from the shaft. Preferably, also, the arm has an abrupt shoulder which engages the operating member when the usual brake employed becomes so loose as to permit the momentum of the shaft to carry it beyond its normal position. A stop is provided which limits the backward movement of the arm.

Referring now to Figs. 7 to 12, O is the operating member, pivoted at its lower end and normally in the path of the arm D of the key C. If the operator allows the pedal connected to the operating-rod P to remain untouched, the shaft if first clutched will be unclutched as soon as the arm reaches the position of Fig. 7, where it is pressed backward by the operating member O. According to my invention the arm D is pressed firmly back to the unclutching position, and for this purpose the member O must press against the arm with considerable force. Also the arm must not move backward beyond the position necessary to bring the clutch-key C to the point indicated in Fig. 7, and for this purpose a stop Q is provided in the rear of the arm. As the arm D comes against and rides over the member O the latter first yields a short distance, the point e of contact of the arm D and member O being substantially or nearly in line with the resisting reactions at C and R, respectively, Fig. 11. Then as the key C is carried forward the contact-point e' is thrown more out of line, Fig. 12, and finally by a sort of toggle action the arm D is thrown quickly upward to the completely-turned position of Fig. 7, whereupon the shaft stops (its momentum being overcome by the usual or any suitable brake) and the hub B B' continues to revolve. The dotted lines, Figs. 11 and 12, connecting the centers of pressure of the key D and the abutment R with the point of contact of the arm D and operating member O indicate the toggle movement. This operation is effected by providing a yielding abutment R, upon which the member O is supported and upon which a shoulder formed by a nut S bears against a spring T. The abutment R is carried in guides U U', attached to the frame of the machine, the lower one of which serves as a support for the spring T. A nut V on the lower end of the abutment R serves to adjust its normal distance of projection toward or from the shaft. As shown in Fig. 7, the movement of the member O is permitted by mounting it upon a shaft W in solid flaring bearings X and X', upon the opposite end of which shaft is an arm Y, attached to the pedal-rod P. As the end of the operating member O or the bearing-face of the arm D is worn away the abutment R may be moved farther up by unscrewing the nut V, the strength of the spring being retained, if desired, by an adjustment of the nuts S. It is understood that the ordinary operation is similar to that of the well-known clutches of this type in general use—that is to say, whenever the operator presses upon the pedal and pulls the rod P down the operating member O is moved out of the path of the clutch-arm D and the hub as soon as the next recess E registers with the clutch-key will be clutched with the shaft by the action of the spring b pressing the arm D forward. The pins D limit the sidewise movement of the operating member O. The operating member O may be mounted in any suitable manner to obtain the movement described. For example, as shown in Figs. 8, 9, and 10, the operating member O may be one arm of an angle-lever, of which the part Y, connected to the rod P, forms the other arm, and which angle-lever is slotted to permit of the necessary endwise movement of the member O along a pin c on the frame of the machine under the action of the spring T.

Though I have described with great particularity of detail an apparatus embodying my invention, yet it will be understood that the invention is not limited to the particular embodiment disclosed, but that various modifications thereof are possible to those skilled in the art without departure from the invention as set forth in the following claims.

What I claim is—

1. The combination with a shaft, of a hub surrounding the same, a clutch adapted to connect said shaft and hub whereby one is driven by the other, a holdback adapted to prevent the driven part from moving forward relatively to the driving part, and means whereby the movement of the clutch to the clutching position brings said holdback into operation.

2. The combination with a shaft, of a hub surrounding the same, a clutch adapted to connect said shaft and hub whereby one is driven by the other, a holdback adapted to prevent the driven part from moving forward relatively to the driving part, a spring tending to move said holdback to an operative position, and means for restraining said spring, in the unclutching position of the clutch, and for releasing said spring in the clutching position thereof.

3. The combination with a shaft, of a hub surrounding the same, a clutch-key journaled in said shaft, means for turning said key to clutch said shaft and hub whereby one may be driven by the other, a holdback adapted to prevent the driven part moving forward relatively to the driving part, and means between said holdback and said key whereby turning said key to the clutching position brings said holdback into operation.

4. The combination with a shaft, of a hub surrounding the same, a clutch-key journaled in said shaft, means for turning said key to clutch said shaft and hub whereby one may be driven by the other, a holdback adapted to prevent the driven part moving forward relatively to the driving part, a spring tending to bring said holdback into operation, and means between said holdback and said key for restraining said spring in the unclutching position of the key, and for releasing the same in the clutching position of the key.

5. The combination with a shaft of a hub journaled thereon, a clutch-key journaled in said shaft, means for turning said key to clutch said shaft and hub whereby one may be driven by the other, a fixed stop on said hub, a shouldered bolt carried by said shaft, a spring pressing said bolt in a direction to engage said fixed stop to prevent the driven part from moving forward relatively to the driving part, a pin on said key engaging the shoulder on said bolt for restraining said bolt in the unclutching position of the key, said pin being out of engagement with said shoulder to release the bolt in the clutching position of the key.

6. The combination with a shaft, of a hub surrounding the same, a clutch adapted to connect said shaft and hub whereby one is driven by the other, a fixed stop on one of said parts, a movable stop on the other of said parts, and means for bringing said stops into engagement with each other to prevent the driven part from moving forward relatively to the driving part, said fixed stop being removable at will to permit such relative forward movement of the driven part when the movable stop is in operative position.

7. The combination with a rotary shaft, of a clutch-operating arm carried thereby, a member normally in the path of said arm for moving it backward to the unclutching position, a yielding support for said member permitting it to be displaced by said arm, and means for adjusting the normal distance of projection of said member into said path.

8. The combination with a rotary shaft, of a clutch-operating arm carried thereby, a pivoted member normally in the path of said arm for moving it backward to the unclutching position, a yielding abutment for supporting said member, and means for adjusting the position of said abutment toward or away from said shaft.

9. The combination with a rotary shaft, of clutch-operating mechanism carried thereby comprising a clutch-operating arm, a spring pressing it in a forward direction toward a clutching position and a stop limiting its backward movement, a member normally in the path of said arm adapted to move said arm backward against its stop, and a yielding support for said member permitting it to yield in a direction away from said shaft.

10. The combination with a rotary shaft, of clutch-operating mechanism carried thereby comprising a clutch-operating arm, a spring pressing it in a forward direction toward a clutching position and a stop limiting its backward movement, a member normally in the path of said arm adapted to move said arm backward against its stop, a yielding abutment for supporting said member, and means for adjusting the position of said abutment toward or from said shaft.

In witness whereof I have hereunto signed my name in the presence of two subscribing witnesses.

WILLIAM KLOCKE.

Witnesses:
OTTO S. BEYER,
E. S. PORTER.